Figure 1:
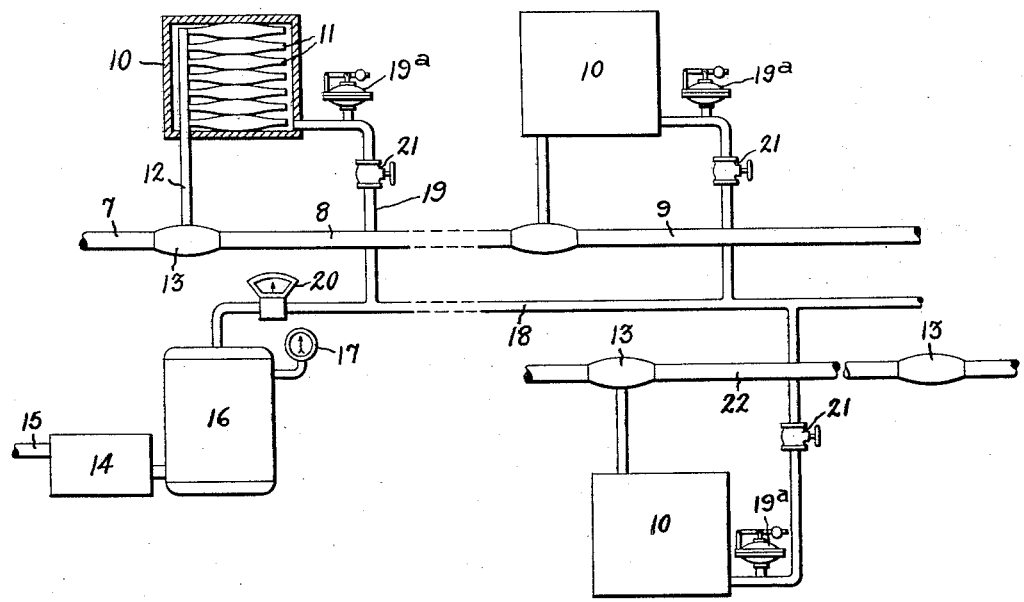

Oct. 31, 1933.   W. S. CLARK   1,933,312
ELECTRIC CABLE SYSTEM
Filed June 26, 1928

Inventor:
Wallace S. Clark,
by Charles E. Tullar
His Attorney.

Patented Oct. 31, 1933

1,933,312

UNITED STATES PATENT OFFICE 1,933,312

ELECTRIC CABLE SYSTEM

Wallace S. Clark, Schenectady, N. Y., assignor to General Electric Company, a corporation of New York Application June 26, 1928. Serial No. 288,491

14 Claims. (Cl. 173—264)

The present invention relates to high tension electrical apparatus and specifically to high tension underground cable systems of the type comprising a conductor, an insulating covering therefor, such as paper, and an outer impervious covering for the insulation, such as lead, and a channel or equivalent means by which the cable may be maintained filled with oil or equivalent insulating fluid. With such apparatus the fluid expands and contracts with changes of temperature and in order to prevent injury it is necessary to provide compensating means. As the oils commonly used will absorb air or gases deteriorating their electrical values, the oil flowing in and out of the cable must not come in contact with air or other gases.

At the present time, it is the practice to employ feeding and pressure reservoirs located at suitably spaced points along the length of the cable which reservoirs are designed to receive fluid from the cable when its temperature rises and to feed the fluid back to the cable as it cools. The feeding reservoirs are exposed to atmospheric pressure but are sealed against the admission of air and in order to obtain the necessary pressure to feed fluid into the cable and keep it filled, the reservoirs must be located at a substantial elevation which means that they must be above the level at which the cable is laid. The pressure reservoirs on the other hand which are hermetically sealed may be and commonly are located in the manholes. The feeding reservoirs operate at substantially constant pressure, such pressure variation as exists due to heating or cooling of the fluid being due chiefly to the spring action of the metal of which the reservoir is made. The pressure reservoirs, on the other hand, are subjected to very substantial changes of pressure. Such changes of pressure, if small, do no harm but if they are of high value as sometimes happens they are liable to cause the cable sheath to bulge at one or more places or to rupture, both of which are highly objectionable for reasons well understood. The fact that as the lead sheath is heated it becomes slightly softer and hence less resistant to internal pressure enhances the danger due to abnormal pressures.

My invention has for its object to provide an arrangement or system whereby the pressures within the individual reservoirs may be controlled at will and kept at any predetermined value, and one which is below the average pressures now commonly employed. My improved arrangement also permits of installing the feeding reservoirs at any desired elevation, either above or below the level of the cable, thereby avoiding the necessity of elevated supporting structures for such apparatus.

For a consideration of what I believe to be novel and my invention, attention is directed to the accompanying description and the claims appended thereto.

Figure 2:
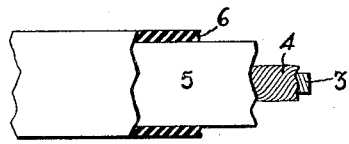

In the accompanying drawing which is illustrative of my invention, Fig. 1 is a diagrammatic view of a high tension underground cable system and Fig. 2 is a detail view of a single conductor oil-filled cable.

Referring first to Fig. 2, reference numeral 3 indicates the hollow core of a cable or oil channel or channels in a cable, 4 the wires forming the conductor, which are laid on and are supported by the core, 5 the insulation, of which closely wrapped-on paper is a good example, and 6 the lead sheath with which the joint coverings and the conductor are enclosed. Only one conductor is shown but two or more may be provided within the sheath when desired.

Referring to Fig. 1, reference numerals 7, 8 and 9 indicate sections of a cable at the same or different elevations which sections are jointed in any suitable way and are enclosed in casings 13 which are soldered to the sheaths to make the whole fluid-tight. Some or all of the joints may be stop-joints, meaning thereby, that they are provided with partitions or means to prevent oil from flowing or migrating from one section to another. The stop-joints are necessary where the cable is laid over an area having appreciable hills and valleys, the purpose being to limit the hydrostatic head at the low places to a reasonable value. Such cables are commonly laid in conduits and are drawn into them through suitable manholes, but they may also be suitably protected by exterior covers and buried in the earth without a conduit.

10 indicates an hermetically-sealed reservoir of which a number are employed in a system of considerable length. Each comprises a container and located therein is a plurality of individual chambered metal cells 11 which are made of thin metal so as to offer small resistance to movement of the walls. They may be supported in any suitable manner, for example, they may rest one on the other. The several cells are connected in parallel as regards the flow of oil to a pipe 12 leading to a cable section, usually at one of the joint coverings 13. The reservoirs may be located at any suitable point and because of the arrangements to be hereinafter described may be on a level with the cable or even below it. In carrying out my invention, the same type of reservoir is employed whenever a reservoir is required and in this manner the necessity of having two distinctly different types is avoided.

In order to maintain the desired and practically constant pressure on the walls of the cells, and through them the pressure on the oil or other fluid in the cable, means for maintaining an elastic fluid pressure within each of the reservoirs is provided. For this purpose it is preferable to use a gas such as $CO_2$ which will be absorbed by the oil in case of the rupture of a cell, but for some cases other fluid under pressure may be used.

14 indicates a suitable pump which receives gas from a suitable source by the pipe 15, and maintains a predetermined pressure within the receiver 16, although any other suitable means may be employed for the purpose. 17 indicates a pressure gauge communicating with the interior of the receiver, and a suitable relief or safety valve may be provided if desired. Gas from the receiver is delivered to a main supply conduit or pipe 18, which is connected by branch pipes 19 to the several reservoirs. The pipe 18 is provided with a flow indicator 20 of any suitable type so that in case of a rupture in the system resulting in an abnormal increase of flow it can readily be detected. The pipe 18 may be laid in the same section or chamber of the conduit as the cable itself or it may be laid in a separate chamber. As the pressures are low it may be made of lead as well as the branch pipes 19. The pipe 18 is connected to all of the reservoirs in parallel and the pressure therein is substantially constant although some variation may be had without injury. The pressure in the pipe should be superatmospheric, usually slightly higher than the pressure in any one of the reservoirs and in this connection it is to be noted that where a reservoir is located at the bottom of an inclined section of cable the pressure of fluid within it, due to fluid in the cable will of necessity be somewhat higher than that in a reservoir located at a greater elevation.

The pressure within each reservoir due to the supply of elastic fluid from the pipe 18 is controlled by any automatically operating reducing valve 21 which may be of ordinary construction. The valves for the several reservoirs will be adjusted or set to maintain the necessary pressures therein and as indicated above this will depend upon the relative elevations of the parts of the cable where the reservoirs are connected.

The pipe 18 and its source of supply may be arranged to supply elastic fluid to the reservoirs of more than a single cable; such an arrangement is shown in the right-hand portion of Fig. 1 wherein 22 indicates a second cable which extends parallel to the first. These cables may belong to the same or different electrical circuits and whenever necessary, suitable insulators will be inserted in the pipe lines.

The fluid pressure acts on the walls of the cells in each reservoir with a practically constant pressure and in a sense functions as a spring of infinite length but without the many complications thereof. By using fluid pressure as the opposing means for the walls of the cells the walls may be so thin as to offer practically no opposition to inward and outward movements as the oil or other fluid from the cable flows from and into the chambers of the cells. As the two fluids act over the entire external surfaces of the cells uniform pressure is exerted thereon and hence the necessity of reinforced parts is avoided. To limit the pressure in the reservoir to any desired maximum safety valves 19a are inserted in the system.

As shown, the fluid insulation from the cable flows into and out of the chambers within the cells. I may if desired reverse this arrangement and cause the elastic fluid from the pipe 13 to enter the chambers in the cells in which case the fluid from the cable would fill the container and act on the outer surfaces of the walls of the cells. This need not result in any change of structure but merely the transposition of the pipes connected thereto.

In operation, the cable heats as the amount of current flowing through it increases, this in turn causes the insulating oil or other fluid therein to expand and to flow into the several cells of each reservoir. As the load on the cable decreases, it cools as well as the fluid contained therein and the cells of the reservoirs thereupon return fluid to the cable, the pressure during both actions remaining between limits set by the reducing valve 21 and the safety valve 19a. If desired a single valve to accomplish this may be used.

By reason of my improvements the pressure of insulating fluid within the cable is maintained between practical working limits at all times and the reservoirs and their cells may be made of the simplest possible construction, thereby avoiding the use of all auxiliary devices to obtain the desired result. The fluid supply means, pipe line and its branches are of the simplest form and while they represent a certain initial cost this is offset by the simplicity of the system as a whole.

The reservoirs can be made approximately one-third smaller than those designed to operate in the usual manner heretofore. To take care of changing conditions from no load in cold weather to full load in hot weather, the reservoirs should have a capacity of the order of one gallon for each one hundred feet of cable.

What I claim as new and desire to secure by Letters Patent of the United States is:

1. The combination of electrical apparatus in which liquid is employed as an insulating medium with a plurality of reservoirs communicating therewith, each of which has a movable wall one side of which is exposed to the liquid contained in the apparatus, a source of elastic fluid under superatmospheric pressure for supplying fluid to the reservoirs, regulating means therefor, and conduit means for transmitting the fluid to the reservoirs where it acts on each wall on the side opposite the liquid and is maintained by the walls out of contact with the liquid.

2. The combination of electrical apparatus in which liquid is employed as an insulating medium, with reservoirs communicating therewith at spaced intervals, each of which has a plurality of thin walled cells located therein, the liquid from the apparatus being free to flow into and from the containers for causing movements of the walls of the cells, a source of elastic fluid under superatmospheric pressure which is common to and supplies fluid in parallel to the containers and which acts on the walls of the cells in opposition to the liquid entering the containers from the apparatus, and regulating means at each reservoir for independently adjusting the pressure of the elastic fluid admitted thereto.

3. The combination of an electric cable in which liquid is employed as an insulating medium with a plurality of reservoirs each comprising a sealed container and at least one cell therein having a movable wall, the liquid from the cable being free to flow into and from the container for causing movement of said wall, and a means common to the reservoirs for maintaining predetermined and substantially constant elastic fluid pressure therein which fluid pressure acts on said wall in opposition to the liquid entering the reservoirs from the cable.

4. The combination of an electric cable in which liquid is employed as an insulating medium with reservoirs connected thereto in parallel into and from which liquid from the cable is free to flow, each of said reservoirs comprising a sealed container and a cell which has a freely movable wall, a source of elastic fluid pressure independent of the liquid within the cable which is common to the reservoirs and opposes certain of and assists other movements of the walls, said fluid being separated from the liquid in each container by the wall, and a means for controlling the flow of elastic fluid from the source to the containers and maintaining predetermined pressures on the latter.

5. The combination of an electric high tension cable in which liquid is employed as an insulating medium with reservoirs connected thereto at spaced intervals some of which reservoirs are located at different elevations and into and from which liquid from the cable is free to flow, each of said reservoirs comprising a sealed container and a cell having a movable wall, a source of elastic fluid pressure common to the reservoirs which is maintained separate from the fluid within the cable and which acts on said wall, and valve means operating to control the flow of fluid from the source to the containers where it acts on the walls, said valve means maintaining predetermined but different pressure on the reservoirs having different elevations.

6. The combination of an electric cable in which liquid is employed as an insulating medium with reservoirs connected thereto at spaced intervals and into and from which liquid from the cable is free to flow in response to temperature changes of the cable, each of said reservoirs comprising a sealed container and a cell having a wall which moves in response to changes of liquid pressure within the cable, a main conduit which extends alongside the cable and conveys elastic fluid under pressure, branch conduits leading from the conduit to the reservoirs to permit the elastic fluid to act on the said walls of the cells, valve means for controlling the flow of fluid through the branch conduits, and means for supplying the main conduit with elastic fluid under pressure.

7. The combination of an electric cable in which liquid is employed as an insulating medium with reservoirs connected thereto at spaced intervals and into and from which liquid from the cable is free to flow in response to temperature changes of the cable, each of said reservoirs comprising a sealed container, and a plurality of sealed cells, the walls of which are freely movable in response to changes of liquid pressure within the cable, a main conduit for supplying elastic fluid to the containers which acts in opposition to certain movements of said walls, said walls separating the two fluids, a receiver connected with the conduit, branch conduits connecting the main conduit to the containers, and automatic pressure responsive valves between the branch conduits and the containers.

8. The combination of an electric cable in which liquid is employed as an insulating medium with a reservoir communicating therewith and comprising a sealed container and a plurality of chambered cells located therein which have flexible walls, a means for connecting the chambers of the cells in parallel relation as regards the flow of liquid, an elastic fluid supply means which is common to and acts on the cells in opposition to the liquid flowing from the cable, said walls separating the liquid and elastic fluid, and conduit means for connecting certain of the elements of the reservoir to the cable and the balance to the elastic fluid supply.

9. The combination of an electric cable in which liquid is employed as an insulating medium with a sealed reservoir which comprises two principal chambers separated by an elastic wall to one of which chambers liquid from the cable has free access, and to the other an elastic fluid which acts through the wall in opposition to the first, a source of elastic fluid under a pressure which is somewhat greater than the pressure of the fluid within the cable, an automatic pressure-reducing valve which controls the pressure admitted to the second named chamber of the reservoir, and an automatic escape valve which limits the pressure within said second chamber.

10. The combination of an electric cable in which liquid is employed as an insulating medium with spaced reservoirs each of which comprises two principal chambers separated by an elastic wall to one of which chambers liquid from the cable has free access and to the other an elastic fluid which acts through the wall in opposition to the first, a source of elastic fluid supply, a conduit independent of the cable which receives fluid from the source and supplies it to the reservoirs in parallel, and a flow meter acted upon by the elastic fluid flowing through the conduit to indicate abnormal flow of said fluid.

11. The combination of an electric cable in which liquid is employed as an insulating medium with a reservoir which comprises two principal chambers separated by an elastic wall to one of which chambers liquid from the cable has free access, and to the other elastic fluid which acts through the wall in opposition to the first, a source of gas supply under a pressure which is somewhat greater than the pressure of the liquid within the cable, said gas being capable of being absorbed by the liquid used in the cable, and an automatic pressure-reducing valve which controls the pressure admitted to the second named chamber of the reservoir, and means for controlling the supply of gas to the second named chamber of the reservoir.

12. The combination of an electric cable containing liquid insulation with variable capacity reservoirs located at spaced intervals along the length of the cable, each of which comprises a sealed chamber and a movable wall, conduits connecting the reservoirs in parallel with the cable so that one side of each wall is acted upon by the liquid insulation of the cable, and means common to the reservoirs for simultaneously and continuously supplying them with gas under superatmospheric pressure on the side of the wall opposite to that subjected to the liquid and in amounts sufficient to establish and maintain different pressures in the reservoirs having different elevations.

13. The combination of an electric cable containing liquid insulation with a conduit extending along the side of the cable, a controllable source of elastic fluid under superatmospheric pressure connected to the conduit, variable capacity reservoirs located at spaced intervals along the lengths of the cable and conduit, each of which comprises a sealed chamber and a movable wall, and conduits connecting the reservoirs in parallel with the cable and the conduit so that said wall is exposed on one side to the liquid of the cable and on the other side to the elastic fluid of the conduit, said wall effecting complete separation of the liquid and elastic fluid.

14. The combination of an electric cable containing insulating oil with variable capacity reservoirs connected to the cable at spaced intervals along its length, each of said reservoirs comprising as its two principal members a sealed tank and a sealed cell, said oil having free access to one of the members, a source of $CO_2$ gas under pressure, means receiving gas from the source and simultaneously and continuously supplying it to the other of said reservoir members, and regulating means between the supply means and said reservoir members for establishing and maintaining gas pressures in the reservoirs determined by the respective elevations thereof.

WALLACE S. CLARK.